March 2, 1948. P. E. V. JACOBSEN 2,436,997
CARDBOARD BOX FOR EGGS
Filed Sept. 10, 1938
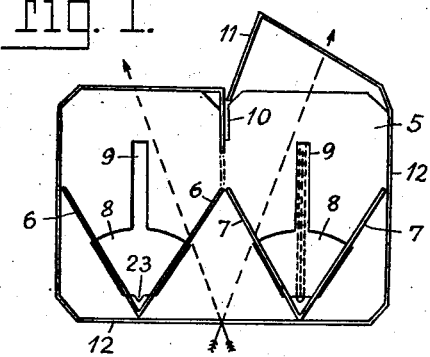
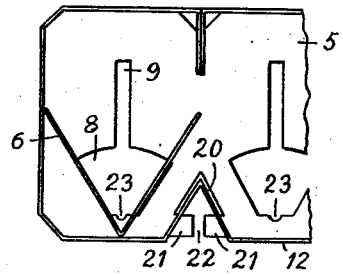
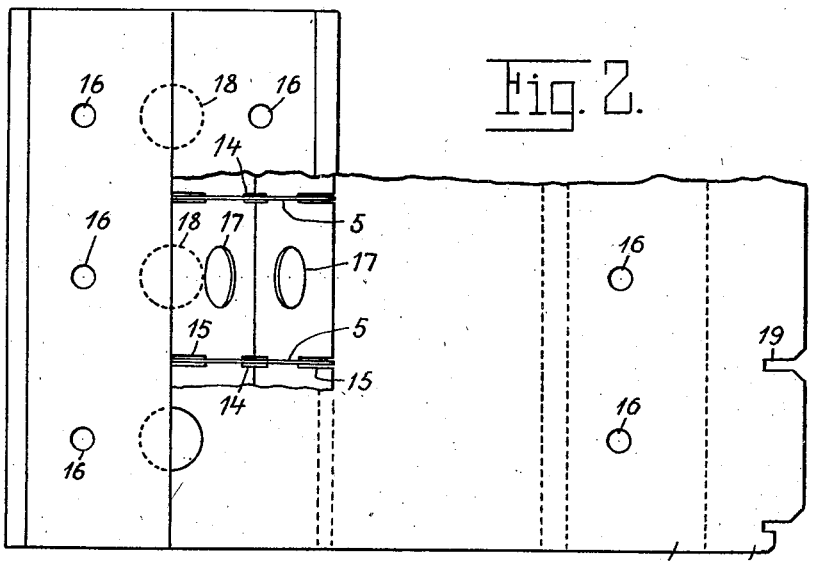
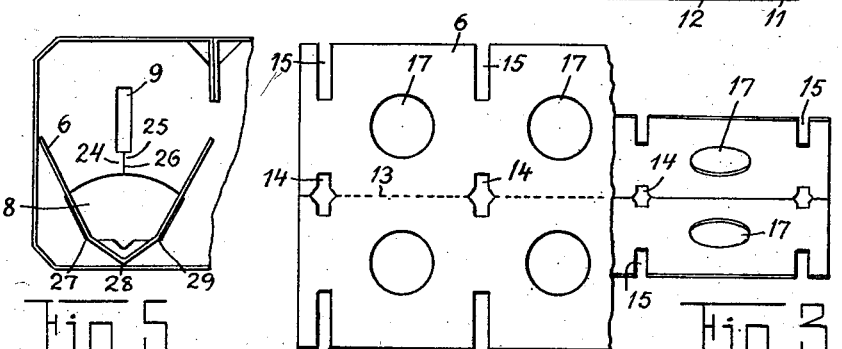
INVENTOR
PETER EMIL VILHELM JACOBSEN
BY Richards & Geier
ATTORNEYS Patented Mar. 2, 1948

2,436,997

UNITED STATES PATENT OFFICE 2,436,997

CARDBOARD BOX FOR EGGS

Peter Emil Vilhelm Jacobsen, Copenhagen, Denmark

Application September 10, 1938, Serial No. 229,247
In Denmark September 18, 1937

Section 3, Public Law 690, August 8, 1946
Patent expires September 18, 1957

2 Claims. (Cl. 229—29)

The invention relates to an egg carton of the kind by which each egg is resting in a separate compartment, which compartments are formed by transverse walls and trough-shaped longitudinal walls, the egg carton itself being encased in a wrapper. The distinguishing feature of the invention consists in that the transverse walls have entirely closed incisions of such a magnitude, shape and position that the longitudinal walls formed in known manner from trough-shaped pieces of cardboard, when folded together, can be inserted by way of the incisions of their proper position relatively to the transverse walls. The longitudinal walls are fitted in known manner with marginal incisions with which they can engage the transverse walls and, thereby, can be maintained in position relatively to the same.

The incisions in the transverse walls are mainly shaped like an inverted isosceles triangle to the top of which a vertical slit is connected which is so long that the trough-shaped pieces of cardboard, in folded state, can be moved from the end to their proper position relatively to the transverse walls, and the slit-shaped marginal incisions in the longitudinal walls have such a length, relatively to the slit in the transverse walls, that the folded longitudinal walls, after having been inserted in the incisions in the transverse walls, can open themselves so as to become trough-shaped. Further, the incisions in the transverse walls at the lower point of the triangle may be fitted with a notch situated opposite the said slit adjoining the triangle, partly in order to give more space for the insertion of the folded longitudinal walls, and partly, when the transverse walls and the longitudinal walls are in the folded state, in order that the longitudinal walls may then be maintained in position in such a manner, relatively to the transverse walls, that the parts of the egg box while being unfolded will open themselves in the correct mutual position, the said notches guiding the longitudinal walls during the unfolding.

The egg box is distinguished by an especially simple construction that is well suited for the manufacture in quantities, as not only the stamping of the longitudinal and transverse walls but also the folding of the former and their insertion into the incisions of the latter can be effected automatically in a machine adapted for the purpose.

Two constructions of the invention are illustrated on the drawing, in which

Fig. 1 shows a cardboard box for eggs, in end elevation,

Fig. 2 the same in plan view, with a portion of one lid torn and unfolded,

Fig. 3 one of the trough-shaped pieces of cardboard, in plan view, partly torn and in unfolded state, and Figs. 4 and 5 fragments of modified constructions of the invention, in end elevation.

The egg box shown is adapted to hold six eggs. It has four transverse walls 5 and two trough-shaped pieces of cardboard 6 and 7. The transverse walls, which are all alike, have a practically triangular incision 8, to which a vertical slit 9 is connected. Further, the top of each transverse wall is fitted at the centre with a vertical incision 10 which when the box is closed will serve to hold two closing flaps 11 from a wrapping member 12.

As shown in Fig. 3, the trough-shaped pieces of cardboard 6 and 7 have, at their line of bend 13, incised slit-shaped apertures 14 adapted to engage the transverse walls 5. Along their extreme edge they have further a corresponding number of slits 15 which similarly engage the transverse walls when the egg box is assembled.

When the longitudinal and transverse walls of the egg box are to be assembled, the trough-shaped pieces of cardboard in folded state are passed from the ends inward through the incisions 8 of the transverse walls 5 with the corresponding slits 9, as shown by dotted lines in Fig. 1. The pieces of cardboard 6 and 7 are moved so far forward that the slots 14 and 15 come opposite the corresponding transverse walls. When this is done, the trough-shaped pieces of cardboard are cut off, after which the resilience along the bend 13 will cause them to open automatically, so as to occupy the position shown by full lines in Fig. 1. Then the edges of the transverse walls are trimmed, and the interior parts of the cardboard box are thereby finished and assembled.

As shown in Fig. 2, the two lids of the wrapper may be fitted with holes 16, and the trough-shaped pieces of cardboard with holes 17. Centrally in the bottom of the wrapper a row of holes 18 are cut, and the holes are disposed in such a manner that each individual egg in the box can be illuminated, without the box having to be opened, and without the seal, if any, having to be broken. When the box is placed on a table in which an electric lamp is disposed in a recess and, maybe, covered with a glass plate, the rays of light will pass through the eggs while following the arrows shown in Fig. 1 in such a manner that by moving the eye along the egg box the observer is enabled to ascertain whether the eggs are fresh or not.

In the construction shown in Figs. 1 to 3, the interior parts 5, 6 and 7 are maintained in position within the wrapper 12 in that the closing flaps 11 are fitted with slits 19 engaging the transverse walls 5. When both lids are opened, the internal parts of the egg box with the eggs contained therein may be removed from the wrapper. As shown in Fig. 4, the wrapper 12 may also be connected to the internal parts in that the wrapper bottom is bent upward along the centre line like an inverted V-shaped bead 20, the sides of which are fitted with slits adapted to be engaged by projections 21 on the transverse walls 5. The wrapper is then locked to the interior parts in that the bead 20 is pressed together and directed up through a narrow passage 22 between the two projections 21. When subsequently a pull is exerted in the wrapper from both sides, the compressed bead 20 will open itself into the position shown in Fig. 4, and the two lids can then be closed down, as shown in Fig. 4.

As shown in Fig. 4, the triangular incisions 8 are fitted with notches 23 situated opposite the slit 9. These notches facilitate the insertion of the pieces of cardboard 6 and 7, and they have the effect that the internal parts of the egg box, when in the folded state, i. e. when compressed along a diagonal line will be maintained in such a manner that the parts, when unfolded, will open themselves in the proper mutual position.

As shown in Fig. 5, the slit 9 is downwards closed by two projections 24 and 25, which are separated by a cut 26. These two projections are bent away by the ends of the piece of cardboard 6 or 7, when from the end they are passed through the slits 9. Further, the triangular incision 8 is made somewhat broader than as shown in Figs. 1 and 4, so that the piece of cardboard 6 may have three lines of bend 27, 28 and 29 below instead of a single line, as shown in Figs. 1 and 4, which involves that the cardboard box will have more room for the eggs than the constructions shown in Figs. 1 and 4.

The invention is distinguished by the feature that all of the cardboard parts are of practically rectangular shape, so that only a slight quantity of cardboard is wasted on account of stampings during the manufacture. Further, the parts are of a robust shape, so that the egg box can be manufactured from a thin and cheap cardboard, and still can attain the strength required. Finally, the invention, as mentioned above, is distinguished in that the parts from which the box is composed have such a shape that they can easily be assembled by mechanical means, simultaneously with the manufacture of the individual parts.

The invention can be utilized in other constructions than the one shown on the drawing.

I claim:

1. In a cellular carton having bottom and opposite side walls and hinged cover means, a plurality of compartment-forming transverse partitions, a sector-shaped cut-out adjacent the bottom of each of said partitions, a slit extending upwardly from said cut-out, a longitudinal V-shaped partition foldable along its apex to form a trough adapted to be inserted through said slit when in folded condition, and a plurality of slits in said V-shaped partition for engaging said transverse walls and said sector-shaped cut-out when said V-shaped partition is unfolded.

2. In a cellular carton having bottom and opposite side walls and hinged cover means, a plurality of compartment-forming transverse partitions, a sector-shaped cut-out adjacent the bottom of each of said partitions, a slit extending upwardly from said cut-out, a notch in the apex of said cut-out, a longitudinal V-shaped partition foldable along its apex to form a trough adapted to be inserted through said slit and said notch when in folded condition, and a plurality of slits in said V-shaped partition for engaging said transverse walls and said sector-shaped cut-out when said V-shaped partition is unfolded.

PETER EMIL VILHELM JACOBSEN.

REFERENCES CITED

The following references are of record in the file of this patent:

UNITED STATES PATENTS

| Number | Name | Date |
| --- | --- | --- |
| 976,318 | Vernon | Nov. 22, 1910 |
| 1,755,208 | Coyle | 1930 |
| 1,880,074 | Coyle | Sept. 27, 1932 |
| 2,009,874 | Cauley | July 30, 1935 |
| 2,010,437 | Nuyts | Aug. 6, 1935 |

FOREIGN PATENTS

| Number | Country | Date |
| --- | --- | --- |
| 79,521 | Sweden | June 7, 1931 |